US007926697B2

(12) United States Patent
Shekhawat et al.

(10) Patent No.: US 7,926,697 B2
(45) Date of Patent: Apr. 19, 2011

(54) UNDERFILL FORMULATION AND METHOD OF INCREASING AN ADHESION PROPERTY OF SAME

(75) Inventors: Linda Shekhawat, Tucson, AZ (US); Gregory S. Constable, Chandler, AZ (US); Youzhi E. Xu, Gilbert, AZ (US); Nisha Ananthakrishan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 11/857,441

(22) Filed: Sep. 19, 2007

(65) Prior Publication Data

US 2009/0076220 A1    Mar. 19, 2009

(51) Int. Cl.
*B23K 31/02* (2006.01)
*B23K 35/22* (2006.01)
(52) U.S. Cl. .................. 228/180.22; 228/207; 228/223; 148/22; 524/80; 524/919
(58) Field of Classification Search ............ 148/22; 228/180.22, 207, 223; 524/1, 80, 85, 104, 524/265, 588, 919, 923
See application file for complete search history.

(56) References Cited

U.S. PATENT DOCUMENTS

| 4,571,410 | A * | 2/1986 | Nevins et al. | 523/122 |
| 2007/0265373 | A1* | 11/2007 | Bates et al. | 523/436 |
| 2008/0260955 | A1* | 10/2008 | Hoyles et al. | 427/386 |
| 2009/0082486 | A1* | 3/2009 | Bates et al. | 522/170 |

FOREIGN PATENT DOCUMENTS

| WO | WO 2006052725 A1 * | 5/2006 |
| WO | WO 2006052728 A1 * | 5/2006 |
| WO | WO 2006052729 A1 * | 5/2006 |

OTHER PUBLICATIONS

Paula C. A. Barreleiro et al., Letter to the Editor, "13C-NMR Evidence on Amphiphile Lifetime in Reverse (Water-in-Oil) Micelles Formed by a Poloxamer Block Copolymer"; Journal of Colloid and Interface Science 206, 357-360 (1998).
Yoshikl Chujo, et al., "Synthesis of polysiloxane-polyoxazoline graft copolymer by hydrosilylation reaction", Polymer Bulletin 19, 435-440 (1988).
Guido Kickelbick, et al., "Spontaneous Vesicle Formation of Short-Chain Amphiphilic Polysiloxane-b-Poly(ethylene oxide) Block Copolymers", 2003 American Chemical Society, Langmuir 2003, 19, 3198-3201.
C. Nardin, et al., "Amphiphilic block copolymer nanocontainers as bioreactors", The European Physical Journal E 4, 403-410 (2001).
Stephan Forster, et al., "Functional structural hierarchies from self-organizing polymers", From Self-Organizing Polymers to Nanohybrid and Biomaterials, Angew. Chem. Int. Ed. 2002, 41, 688-714.
Shuiqin Zhou, et al., "Water-Induced Micellar Structure Change in Pluronic P103/Water/o-Xylene Ternary System", Journal of Polymer Science: Part B: Polymer Physics, vol. 36, 889-900 (1998).
M. Rutnakornpituk et al., "Formation of cobalt nanoparticule dispersions in the presence of polysiloxane block copolymers", Polymer 43 (2002) 2337-2348.
Lydia M. Feller, et al., Influence of Poly(propylene sulfide-block-ethylene glycol) Di- and Triblock Copolymer Architecture on the Formation of Molecular Adlayers on Gold Surfaces and Their Effect on Protein Resistance: A Candidate for Surface Modification in Biosensor Research, American Chemical Society, Macromolecules, vol. 38, No. 25, 2005, pp. 10503-10510.
Metha Rutnakornpituk, Synthesis of Silicone Magnetic Fluids for Use in Eye Surgery, Dissertation submitted to the faculty of the Virginia Polytechnic Institute and State University, 2002, pp. 281.

* cited by examiner

*Primary Examiner* — Irina S Zemel
*Assistant Examiner* — Jeffrey Lenihan
(74) *Attorney, Agent, or Firm* — Kenneth A. Nelson

(57) ABSTRACT

An underfill formulation includes a solvent (110), a plurality of amphiphilic block copolymers (120) in the solvent, and an adhesion promoter (130) in the solvent. Groups of the plurality of amphiphilic block copolymers form a plurality of micelles (140) in the solvent, with the micelles including a core (141) and a shell (142) surrounding the core, and the adhesion promoter is in the core of at least some of the plurality of micelles.

11 Claims, 6 Drawing Sheets

Flower structure

UNDERFILL FORMULATION AND METHOD OF INCREASING AN ADHESION PROPERTY OF SAME

FIELD OF THE INVENTION

The disclosed embodiments of the invention relate generally to packaging techniques for microelectronics applications, and relate more particularly to underfill formulations in such applications.

BACKGROUND OF THE INVENTION

Microelectronic packages often include dies (or other components) bonded to substrates using a series of solder joints. These solder joints typically are subjected to stress that may be caused by, among other things, a difference in the coefficient of thermal expansion between the silicon die and the substrate. Underfill material (or simply "underfill") is an epoxy or other substance introduced into the area between the die and the substrate and is designed to alleviate or control stresses on the solder joints. Once the underfill is cured it is able to at least partially absorb such stresses, thus potentially reducing the strain on the solder joints and greatly increasing the life of the microelectronic package.

Existing underfill formulations lack sufficient adhesion to interfaces such as silicon (Si) passivation, solder resist, copper (Cu), or interconnect solder, among others. This poor adhesion can lead to underfill/Cu delamination and passivation cracking, both of which raise reliability problems. Investigation into amine based adhesion as well as other attempts to increase adhesion in underfill formulations have been made, but various issues, including environmental and health concerns and reduced pot life has so far plagued these attempts.

BRIEF DESCRIPTION OF THE DRAWINGS

The disclosed embodiments will be better understood from a reading of the following detailed description, taken in conjunction with the accompanying figures in the drawings in which.

Figure 1:
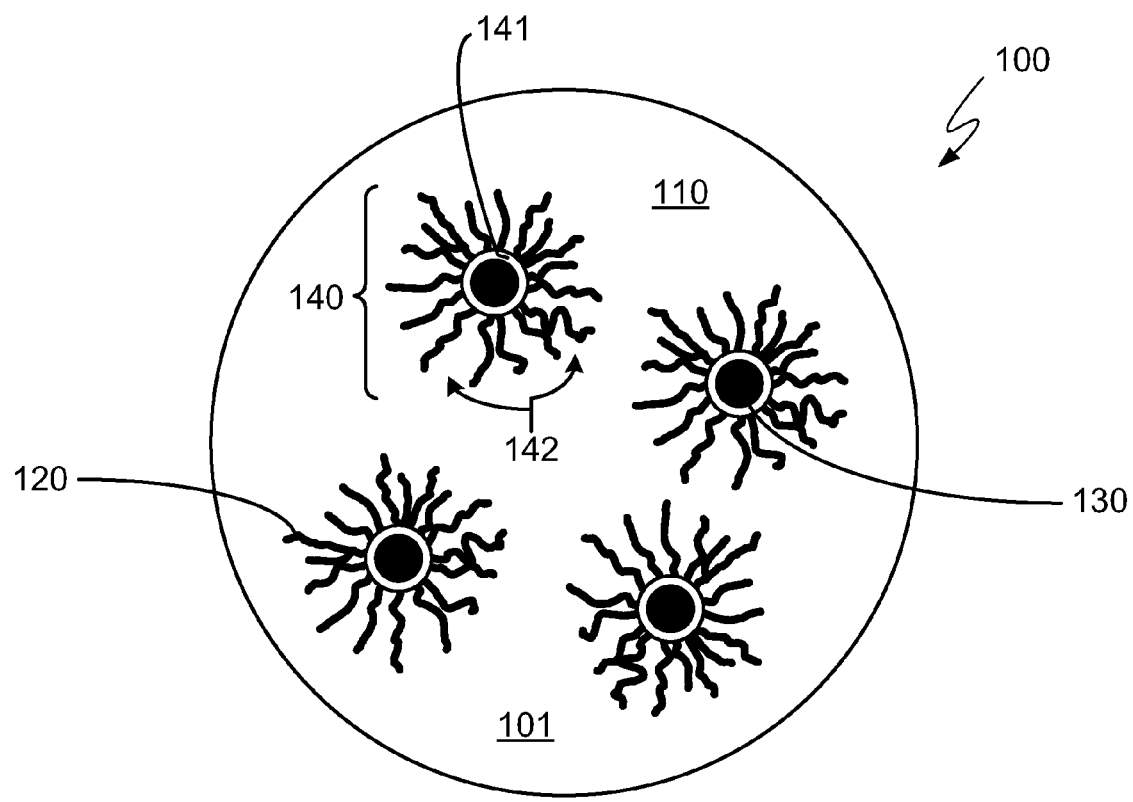
FIG. 1 is a representation of an underfill formulation according to an embodiment of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, an underfill formulation comprises a solvent, a plurality of amphiphilic block copolymers in the solvent, and an adhesion promoter in the solvent. Groups of the plurality of amphiphilic block copolymers form a plurality of micelles in the solvent, with the micelles comprising a core and a shell surrounding the core, and the adhesion promoter is in the core of at least some of the plurality of micelles.

Embodiments of the invention provide a process that uses amphiphilic block copolymers (ABCs) to improve underfill toughness and adhesion and to incorporate and transport adhesion promoters/coupling agents in underfill formulations. The amphiphilic block copolymers form spherical micelles with shell/core architectures in appropriate solvents and can be composed of a wide variety of chemical compositions selected to obtain the desired performance. The micelle core can solubilize malodorous or volatile adhesion promoters and transport them to desired locations where they may be released during cure, thereby minimizing environmental, health, and voiding issues. The chemical composition of the micelle shell, which keeps the micelle dispersed in the underfill, can be selected to have a high affinity to surfaces/interfaces and/or can be functionalized with appropriate functional groups to complex copper bumps, thereby localizing the adhesion promoters to the needed locations. Moreover, the core/shell polymer micelles can act as tougheners to the underfill system.

Referring now to the drawings, FIG. 1 is a representation of an underfill formulation 100 according to an embodiment of the invention. As illustrated in FIG. 1, underfill formulation 100 comprises an epoxy resin 101, a solvent 110, a plurality of amphiphilic block copolymers 120, and a polar reagent acting as an adhesion promoter 130. As will be discussed more fully below, in at least one embodiment the polar reagent is solubilized in the polar cores of the spherical micelles. It should be understood that the micelles can first be produced in a solvent separate from underfill formulation 100 and then later be transferred into underfill formulation 100. This procedure will also be discussed in more detail below.

In a manner that will be further explained below, groups of amphiphilic block copolymers 120 come together to form micelles 140 in solvent 110. Each of micelles 140 comprises a core 141 surrounded by a shell 142. At least some of micelles 140 contain adhesion promoter 130 within their cores 141. In at least one embodiment, and as further discussed below, each one of amphiphilic block copolymers 120 comprises a first block segment that is insoluble in the epoxy resin and a second block segment that is soluble in the epoxy resin. In that embodiment, epoxy resin 101 and the second block segments may be nonpolar and the first block segments may be polar, the first block segments may form polar cores of spherical micelles in epoxy resin 101, and the second block segments may form nonpolar shells of the spherical micelles in epoxy resin 101.

In one embodiment, solvent 110 is a nonpolar solvent, such as toluene, xylene, n-butanol, cylcohexane, or the like. In the same or another embodiment, core 141 is a polar core and shell 142 is a nonpolar shell. Amphiphilic block copolymers are comprised of at least two parts with different solubilities causing self-assembly into well-defined superstructures, typically nanometer sized, known as micelles. The micellar core consists of their insoluble part and this is surrounded by the shell/corona that consists of their soluble parts.

Figure 2:
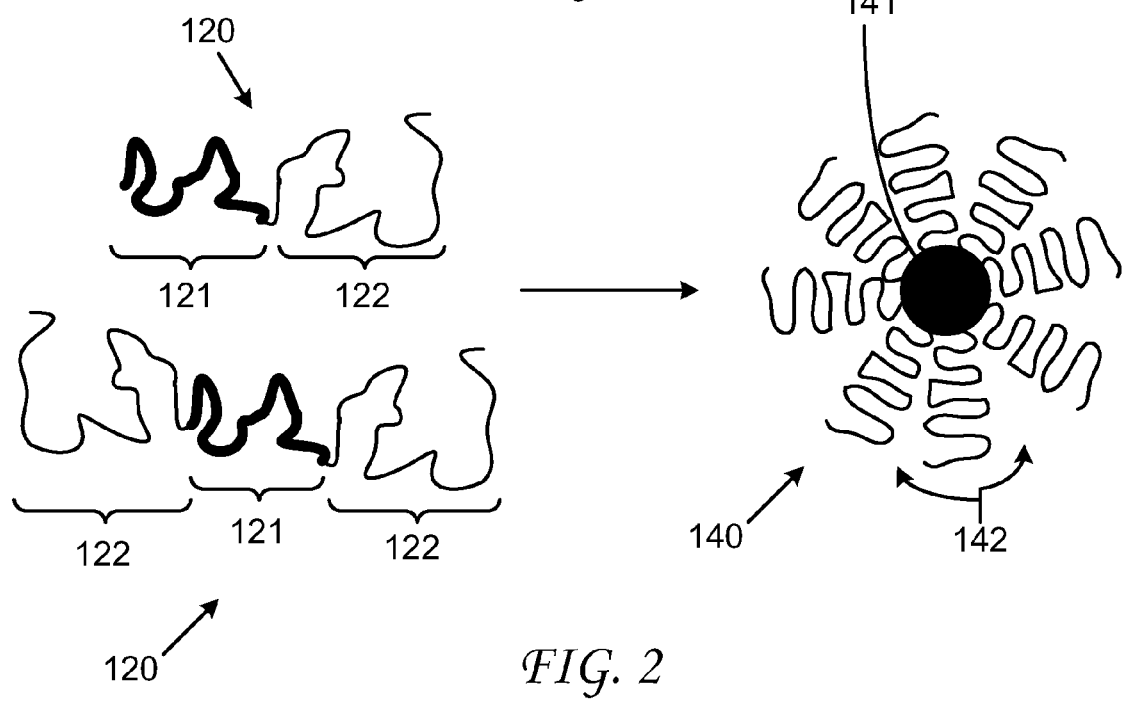
FIG. 2 is a representation of a structure and a mechanism that result in the self-assembly of a group of amphiphilic block copolymers into a core/shell micelle according to an embodiment of the invention.

FIG. 2 is a representation of a structure and a mechanism that result in the self-assembly of a group of amphiphilic block copolymers 120 into a core/shell micelle 140 according to an embodiment of the invention. FIG. 2 illustrates two options for amphiphilic block copolymer 120: a diblock copolymer comprising a block segment 121 attached to a block segment 122; and a triblock copolymer comprising a block segment 121 with block segments 122 attached at both ends. (In non-illustrated embodiments, amphiphilic block copolymer 120 may be made up of still longer strings of block segments.)

When amphiphilic block copolymers 120 are added to a solvent, the various block segments arrange themselves according to their respective solubilities in the solvent. In the illustrated embodiment, block segment 121 is insoluble in the solvent while block segment 122 is soluble in the solvent. This causes amphiphilic block copolymers 120 to self-assemble into micelles 140, with block segments 121 grouped together to form core 141 and block segments 122 forming shell 142.

Amphiphilic block copolymers that form reverse (water-in-oil) micelles contain hydrophobic block segments that are soluble in nonpolar solvents and covalently-connected hydrophilic block segments that form the core of the micelle in order to minimize interaction with polar species. Hydrophilic reagents added to these copolymers in nonpolar solvents will migrate to the hydrophilic core where they are solubilized. The molecular weight of the block segments dictates the maximum solubilizing capacity for a given compatible hydrophilic moiety added.

Referring to FIGS. 1 and 2, amphiphilic block copolymers 120 represent, in one embodiment, between approximately 10 percent and approximately 40 percent by weight of solvent 110. In one embodiment, each one of amphiphilic block copolymers 120 comprises a polar block covalently bonded to a first nonpolar block at a first end thereof, and in the same or another embodiment each one of amphiphilic block copolymers 120 further comprises a second nonpolar block covalently bonded to a second end of the polar block. In an embodiment where solvent 110 is a non-polar solvent, block segments 121 of amphiphilic block copolymers 120 comprise the polar (or hydrophilic) blocks, and block segments 122 of amphiphilic block copolymers 120 comprise the nonpolar (or hydrophobic) blocks.

In one embodiment, the nonpolar block comprises siloxane and the polar block comprises one of poly(methyl methacrylate), poly(N-acetylethylenimine), and a polyether (or another polar polymer block). The siloxane segments will disperse in the epoxy resin and migrate to the interfaces in the package when dispensed. This tendency for siloxanes to saturate the surfaces will help to localize the adhesion promoter contained within the polar core of the micelles. A terminal group of the nonpolar block (e.g., a hydroxyl group of the terminal nonpolar segment) may be functionalized with a copper complexing functional group, which may be done in order to help localize the adhesion promoters to the Cu bump. As an example, the copper complexing group can comprise a sulfur-containing group such as epichlorosulfide or the like.

As an alternative to using a copper complexing functional group, the localization of adhesion promoters may be achieved using an amphiphilic block copolymer having a chemical composition with inherent adhesion to copper. As an example, the sulfur group in the backbone of poly(propylene sulfide)-b-poly(ethylene oxide) tri- and diblock copolymers is known to have affinity for copper. As another example, the thiol group in the polymer backbone of the nonpolar (polysulfide) block should have high affinity for copper bumps and should help localize the micelles containing adhesion promoters in the polar core.

In a different embodiment, the nonpolar block comprises one of a poly(propylene oxide) and a poly(butylene oxide) and the polar block comprises a poly(alkyl ether) such as poly(ethylene oxide) or the like. The nonpolar blocks such as poly(propylene oxide) and poly(butylene oxide) type block chains will disperse in the epoxy resin and migrate to the interfaces in the package when dispensed. As was the case for the embodiment discussed in the preceding paragraph, the terminal groups of the non-flower micellar structure may be functionalized with Cu complexing functional groups, or a chemical composition with inherent adhesion to copper may be used, in order to help localize the adhesion promoters to the Cu bump.

In a different embodiment, each one of the plurality of amphiphilic block copolymers comprises a dendrimer, possibly comprising a shell functionalized with a copper complexing functional group in order, once again, to help localize the adhesion promoters to the Cu bump. The inherent ultra-low viscosity of the dendrimers that would result in an improved flow of the underfill material may represent an added benefit of this embodiment.

FIGS. 3-7 depict chemical compositions of amphiphilic block copolymers according to embodiments of the invention. In each of these figures the chemical structures are given along with the proposed solution structure in the nonpolar epoxy resin. The bracketed block segments indicate polar segments which make up the core of the micelle. The unbracketed block segments are nonpolar groups that will preferentially interact with the epoxy resin. The covalent bond links the nonpolar and polar block segments. The molecular weight of a given block segment will be selected to obtain a stable micelle that can solubilize sufficient quantities of polar adhesion promoters.

Figure 3:
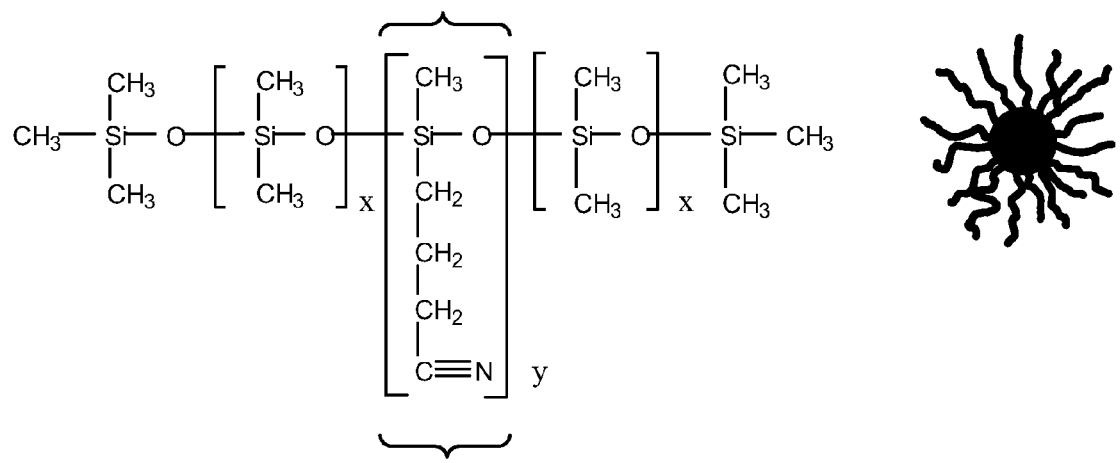
FIGS. 3-7 depict chemical compositions of amphiphilic block copolymers according to embodiments of the invention.
Figure 4:
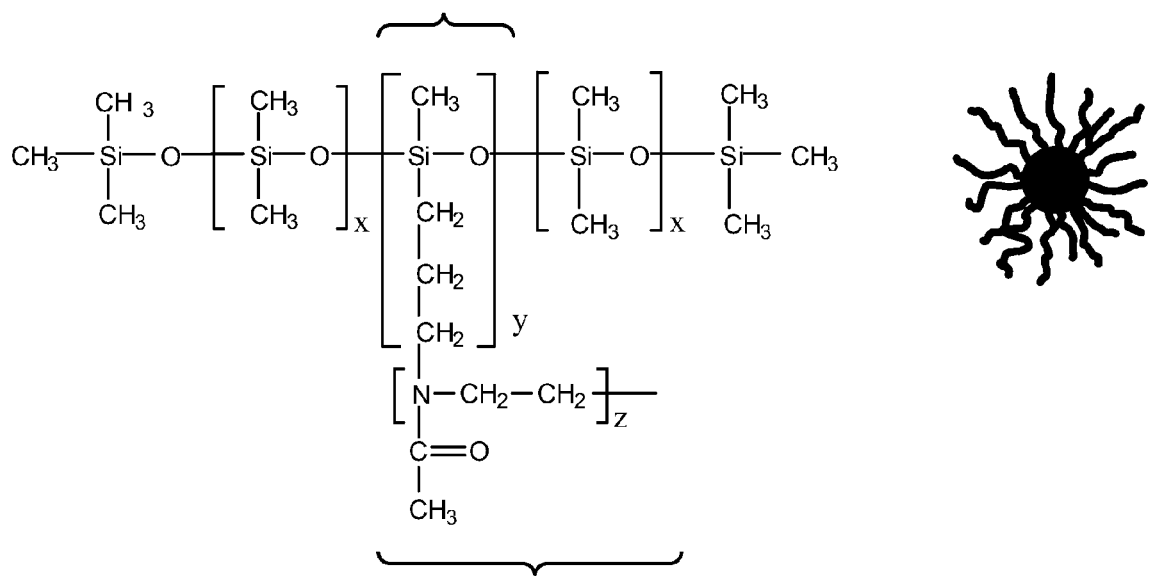
Figure 5:
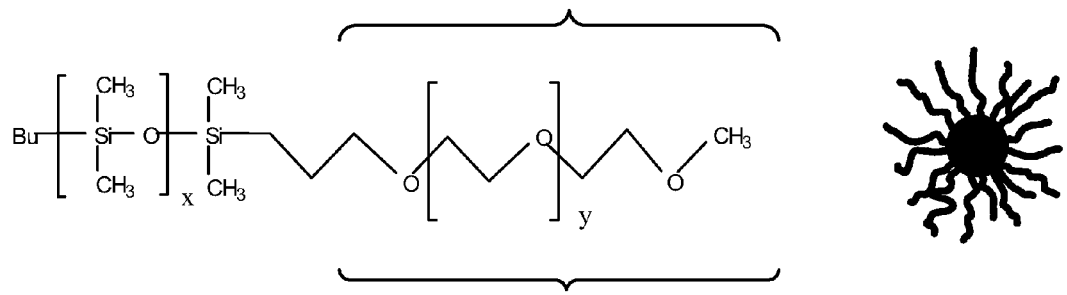
Figure 6:
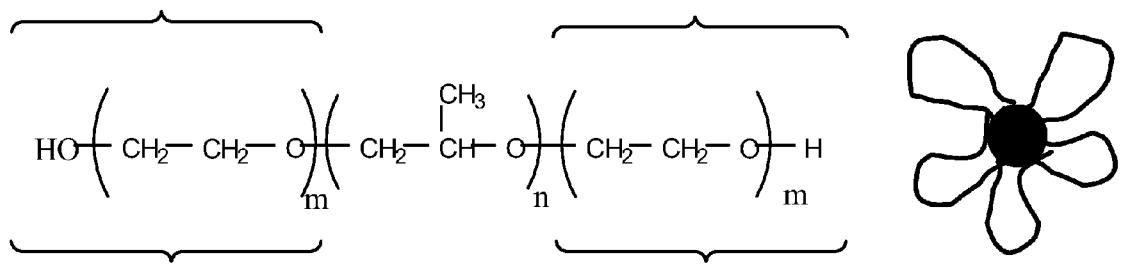
Figure 7:
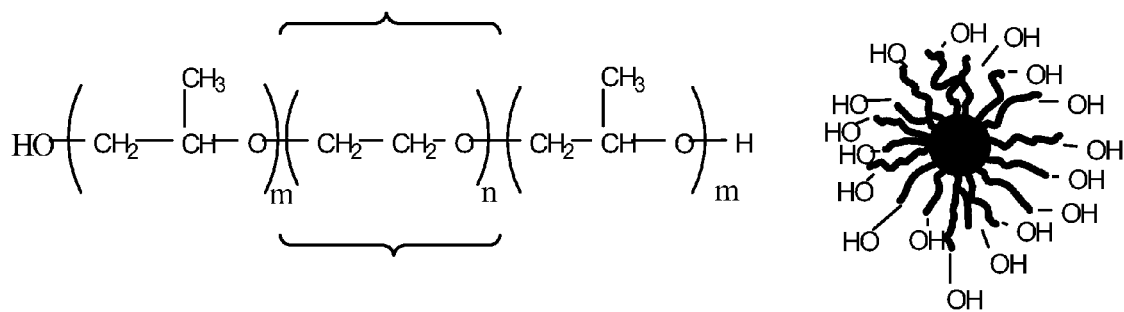
Figure 8:
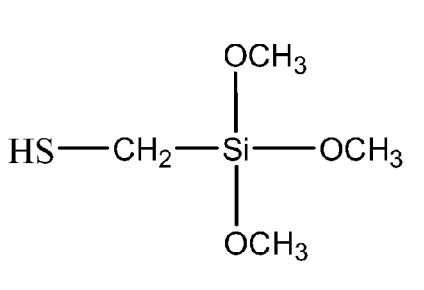
FIGS. 8-17 depict chemical structures of various adhesion promoters according to embodiments of the invention.
Figure 9:
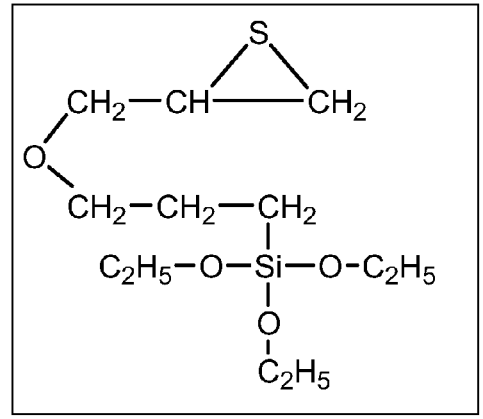
Figure 10:
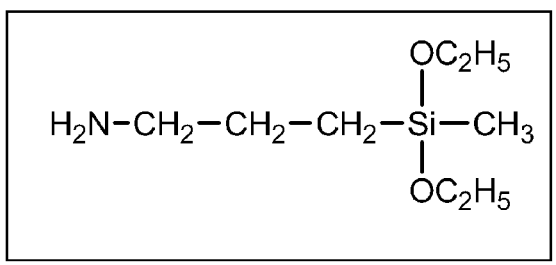
Figure 11:
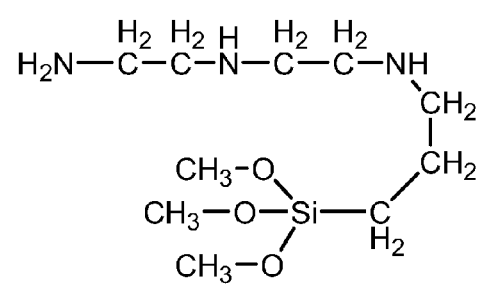
Figure 12:
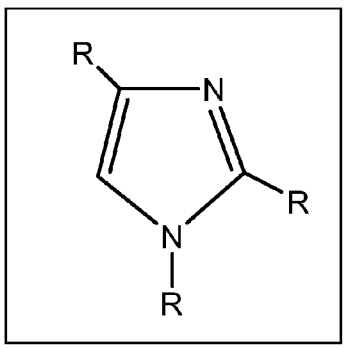
Figure 13:
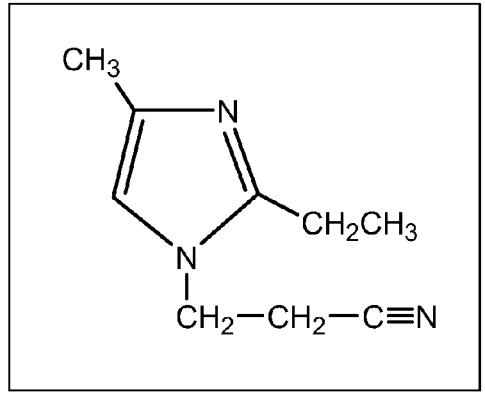
Figure 14:
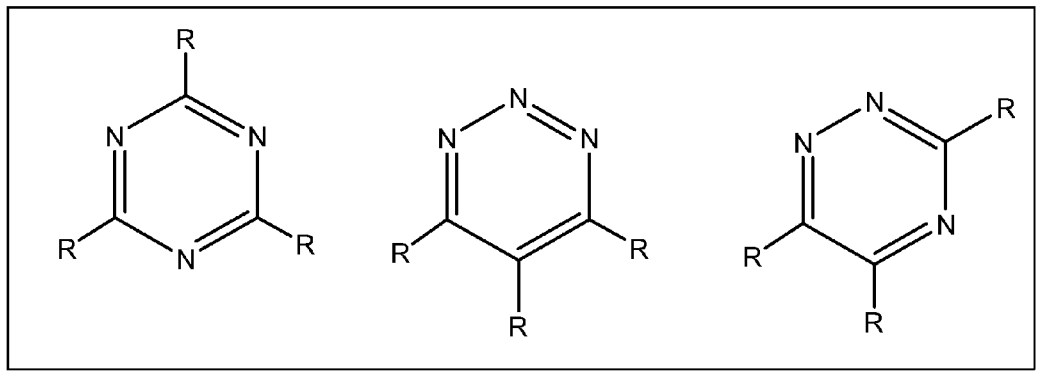
Figure 15:
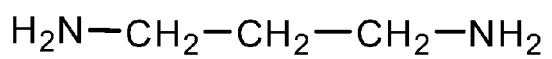
Figure 16:
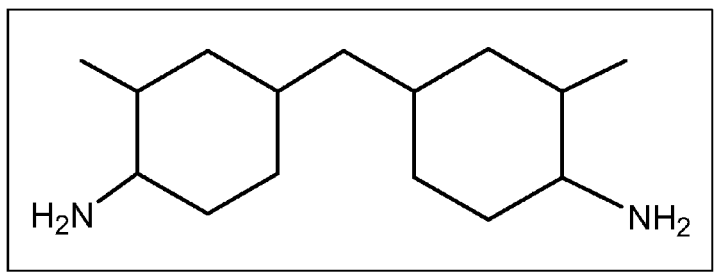
Figure 17:
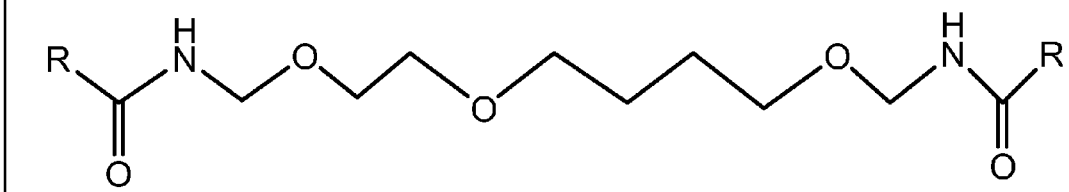

FIG. 3 depicts poly[dimethylsiloxane-b-(3-cyanopropyl) methylsiloxane-b-dimethylsiloxane] (PDMS-PCPMS-PDMS). FIG. 4 depicts polysiloxane-poly(N-acetylethylenimine) graft copolymer in center block of a triblock copolymer. FIG. 5 depicts polysiloxane-b-poly(ethylene oxide) copolymer. Low cost, commercially available poly (ethylene oxide)-b-poly(propylene oxide)-b-poly(ethylene oxide) block and poly(propylene oxide)-b-poly(ethylene oxide)-b-poly(propylene oxide) copolymers can be used as received and can also be chemically modified to promote complexing reactions with Cu bumps. As an example, these polymers are available from BASF under the name Pluronics (such as PL 127, PL 64). FIG. 6 depicts poly(ethylene oxide)-b-poly(propylene oxide)-b-poly(ethylene oxide) block. FIG. 7 depicts poly(propylene oxide)-b-poly(ethylene oxide)-b-poly(propylene oxide).

As mentioned above, siloxane copolymers will migrate to the surface of interfaces (such as interfaces between copper bumps and underfill) to help release entrapped adhesion promoter near the copper bump and serve as rubber tougheners. Release of the entrapped adhesion promoter is anticipated to occur at elevated temperatures that increase the instability of the micelle solution structure. This can occur either when the micelle copolymer loses its solution structure because of phase separation due to a lower critical solution temperature or because of increased solubility of the copolymer due to a temperature increase during cure, and/or to a build up of molecular weight of the epoxy underfill during crosslinking and cure.

Adhesion promoter 130 may comprise, for example, silane compounds containing thiols or amines, imidazoles, or other compounds containing sulfur and or nitrogen, such as aliphatic or cycloaliphatic amines. FIGS. 8-17 depict chemical structures of some such compounds, which may include mercaptomethylmethyldiethoxy-silane (FIG. 8), (3-episulfide-oxypropyl)methyl diethoxy-silane (FIG. 9), (3-aminoproyl-methyl)diethoxysilane (FIG. 10), (3-trimethoxysilypropyl) diethylene-triamine (FIG. 11), imidazoles (FIG. 12) including hydrogen, alkyl, or amine functional groups (indicated by "R" in FIG. 12), such as (1-cyanoethyl-2-ethyl-4-methyl imidazole) (FIG. 13) and the like, triazines including hydrogen, alkyl, amine, or imidiazole functional groups (such groups being indicated by "R" in FIG. 14), and aliphatic or cycloaliphatic amines (FIG. 15) for adhesion and high reactivity, such as anacamine 2049 (FIG. 16), anacamide 910, (FIG. 17) or the like.

Figure 18:
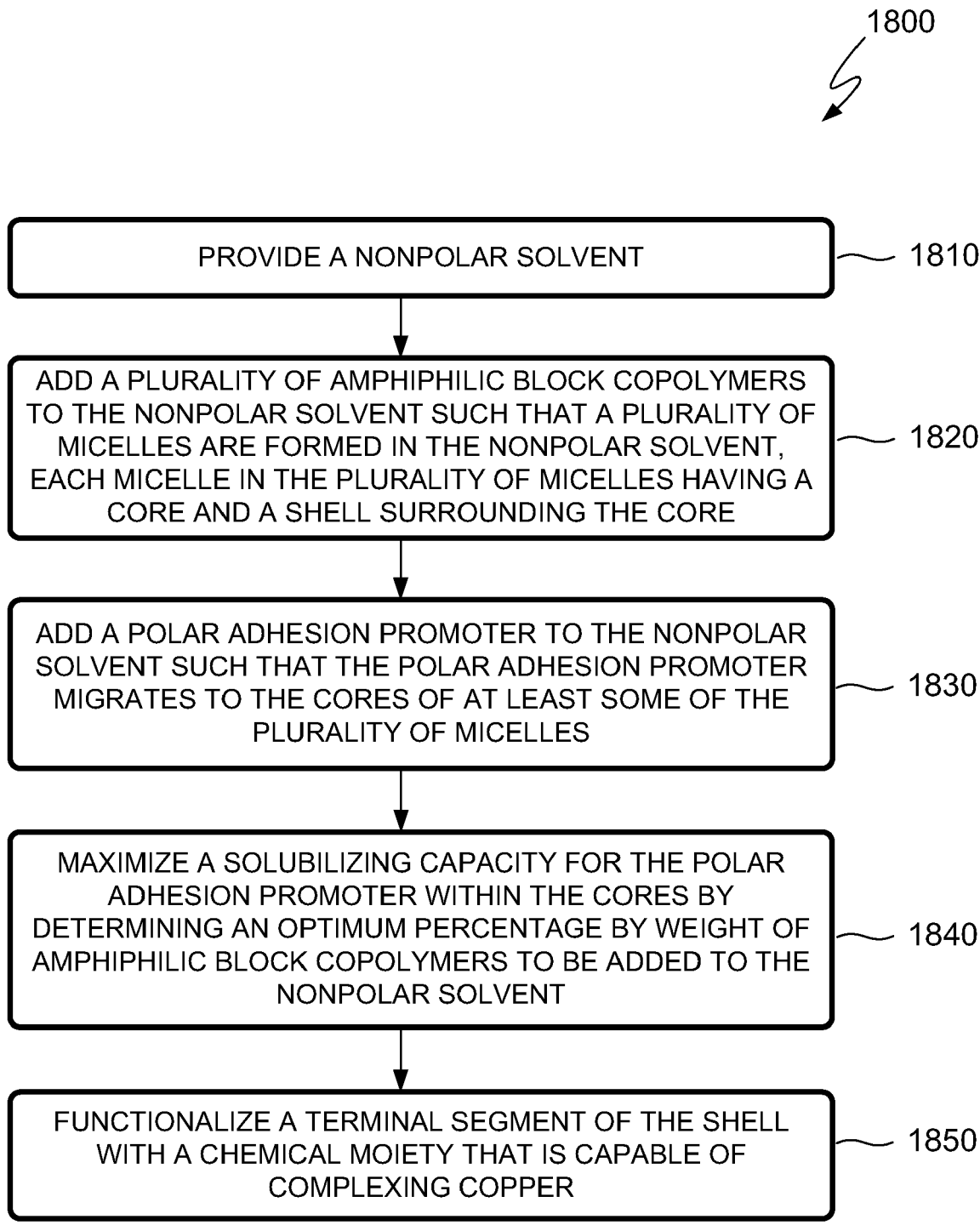
FIG. 18 is a flowchart illustrating a method of increasing an adhesion property of an underfill formulation according to an embodiment of the invention.

FIG. 18 is a flowchart illustrating a method 1800 of increasing an adhesion property of an underfill formulation according to an embodiment of the invention. A step 1810 of method 1800 is to provide a nonpolar solvent. As an example, the nonpolar solvent can be similar to solvent 110 that is depicted in FIG. 1.

A step 1820 of method 1800 is to add a plurality of amphiphilic block copolymers to the nonpolar solvent such that a plurality of micelles are formed in the nonpolar solvent, each micelle in the plurality of micelles having a core and a shell surrounding the core. As an example, the amphiphilic block copolymers, the micelles, the core, and the shell can be similar to, respectively, amphiphilic block copolymers 120, micelles 140, core 141, and shell 142, all of which are first shown in FIG. 1 and also represented, in various possible formulations, in FIGS. 3-7. In one embodiment, step 1820 comprises adding the amphiphilic block copolymers to the nonpolar solvent and later transferring the resulting mixture into an epoxy resin or other underfill formulation. Alternatively, the amphiphilic block copolymers can be added directly to the a low viscosity liquid epoxy resin (such as Bis-F based epoxy or the like).

A step 1830 of method 1800 is to add a polar adhesion promoter to the nonpolar solvent such that the polar adhesion promoter migrates to the cores of at least some of the plurality of micelles. As an example, the adhesion promoter can be similar to adhesion promoter 130 that is first depicted in FIG. 1 and also represented, in various possible formulations, in FIGS. 8-17. In one embodiment, then, step 1830 comprises adding a silane coupling agent.

A step 1840 of method 1800 is to maximize a solubilizing capacity for the polar adhesion promoter within the cores by determining an optimum percentage by weight of amphiphilic block copolymers to be added to the nonpolar solvent. In one embodiment, step 1840 comprises preparing a series of polymer weight percentages in a nonpolar solvent or epoxy and adding small quantities of the adhesion promoter to the nonpolar solvent until phase separation occurs.

A step 1850 of method 1800 is to functionalize a terminal segment of the shell with a chemical moiety that is capable of complexing copper or another material being used as an interconnect in the region where the underfill formulation is to be used. As an example, the chemical moieties can be a sulfur-containing group such as epichlorosulfide or the like.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the underfill formulations and related methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. An underfill formulation comprising:
a nonpolar solvent;
a plurality of amphiphilic block copolymers in the solvent; and
an adhesion promoter in the solvent,
wherein:
groups of the plurality of amphiphilic block copolymers form a plurality of micelles in the solvent, the micelles comprising a polar core and a nonpolar shell surrounding the polar core;
the adhesion promoter is in the core of at least some of the plurality of micelles;

each one of the plurality of amphiphilic block copolymers comprises a polar block covalently bonded to a first nonpolar block at a first end thereof; and each one of the plurality of amphiphilic block copolymers further comprises a second nonpolar block covalently bonded to a second end of the polar block.

2. The underfill formulation of claim 1 wherein:
the adhesion promoter comprises a silane coupling agent.

3. The underfill formulation of claim 1 wherein:
the plurality of amphiphilic block copolymers represent between approximately 10 percent and approximately 40 percent by weight of the solvent.

4. The underfill formulation of claim 1 wherein:
the first nonpolar block comprises siloxane; and
the polar block comprises one of poly(methyl methacrylate), poly(N-acetylethylenimine), and a polyether.

5. The underfill formulation of claim 4 wherein:
a terminal group of the first nonpolar block is functionalized with a copper complexing functional group.

6. The underfill formulation of claim 1 wherein:
the first nonpolar block comprises one of a poly(propylene oxide) and a poly(butylene oxide); and
the polar block comprises a poly(alkyl ether).

7. The underfill formulation of claim 6 wherein:
a terminal group of the first nonpolar block is functionalized with a copper complexing functional group.

8. The underfill formulation of claim 1 wherein:
each one of the plurality of amphiphilic block copolymers has the form of a dendrimer.

9. The underfill formulation of claim 8 wherein:
the dendrimer has the form of a shell functionalized with a copper complexing functional group.

10. An underfill formulation comprising:
a nonpolar solvent;
a plurality of amphiphilic block copolymers in the solvent; and
an adhesion promoter in the solvent,
wherein:
groups of the plurality of amphiphilic block copolymers form a plurality of micelles in the solvent, the micelles comprising a polar core and a nonpolar shell surrounding the polar core;
the adhesion promoter is in the core of at least some of the plurality of micelles;
each one of the plurality of amphiphilic block copolymers comprises a polar block covalently bonded to a first nonpolar block at a first end thereof;
the first nonpolar block comprises siloxane; and
the polar block comprises one of poly(methyl methacrylate), poly(N-acetylethylenimine), and a polyether.

11. The underfill formulation of claim 10 wherein:
a terminal group of the first nonpolar block is functionalized with a copper complexing functional group.

* * * * *